(12) United States Patent
Akiyama (10) Patent No.: US 7,825,960 B2
(45) Date of Patent: Nov. 2, 2010

(54) ELECTRON MULTIPLICATION GAIN CALIBRATION MECHANISM AND ELECTRON MULTIPLICATION GAIN CALIBRATING METHOD

(75) Inventor: Ikuo Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 711 days.

(21) Appl. No.: 11/727,698

(22) Filed: Mar. 28, 2007

(65) Prior Publication Data
US 2007/0228255 A1    Oct. 4, 2007

(30) Foreign Application Priority Data
Mar. 30, 2006    (JP) ............................ 2006-093834

(51) Int. Cl.
*H04N 5/235*    (2006.01)
(52) U.S. Cl. ..................... 348/229.1; 348/187; 348/311
(58) Field of Classification Search ......... 348/311–316, 348/229.1, 255, 208.7, 208.11; 250/208.1; 396/421
See application file for complete search history.

(56) References Cited

U.S. PATENT DOCUMENTS 6,444,968 B1 * 9/2002 Burt et al. ................. 250/208.1
7,291,821 B2 * 11/2007 Robbins .................. 250/208.1

FOREIGN PATENT DOCUMENTS

| EP | 1 688 960 A2 | 8/2006 |
| JP | 7-176721 | 7/1995 |
| JP | 10-304256 | 11/1998 |

OTHER PUBLICATIONS

European Search Report dated Jul. 4, 2007.

* cited by examiner

*Primary Examiner*—Tuan Ho
(74) *Attorney, Agent, or Firm*—McGinn IP Law Group, PLLC (57) ABSTRACT

An electron multiplication gain calibration mechanism, which is capable of readily stabilizing a gain of an electron multiplying CCD image pickup device, is provided. The mechanism comprises a gain adjusting section and a control section. The gain adjusting section is provided independently of gain adjustment by the electron multiplying CCD image pickup device, and sets a reference gain. The control section calibrates the gate voltage for obtaining a desired electron multiplication gain by comparing a video level amplified by the electron multiplication gain to a video level amplified by the reference gain. The control section sets an initial value of the gate voltage, which is supposed to provide the electron multiplication gain equal to the reference gain, and controls the gate voltage gradually so that the video level amplified by the electron multiplication gain becomes equal to the video level amplified by reference gain.

9 Claims, 10 Drawing Sheets

PRIOR ART

FIG.6

PRIOR ART

FIG.7

PRIOR ART

FIG.8

ELECTRON MULTIPLICATION GAIN CALIBRATION MECHANISM AND ELECTRON MULTIPLICATION GAIN CALIBRATING METHOD

BACKGROUND OF THE INVENTION

1. Field of the Invention

The present invention relates to an electron multiplying CCD image pickup device used in devices such as cameras and, in particular, to calibration with respect to changes in a characteristic of the electron multiplying CCD image pickup device.

2. Description of the Related Art

Electron multiplying CCD (Charge Coupled Device) image pickup devices that use impact ionization as a method for improving the sensitivity of solid-state image pickup devices have been disclosed (see Japanese Patent Laid-Open No. 7-176721 and No. 10-304256, for example).

Figure 6:
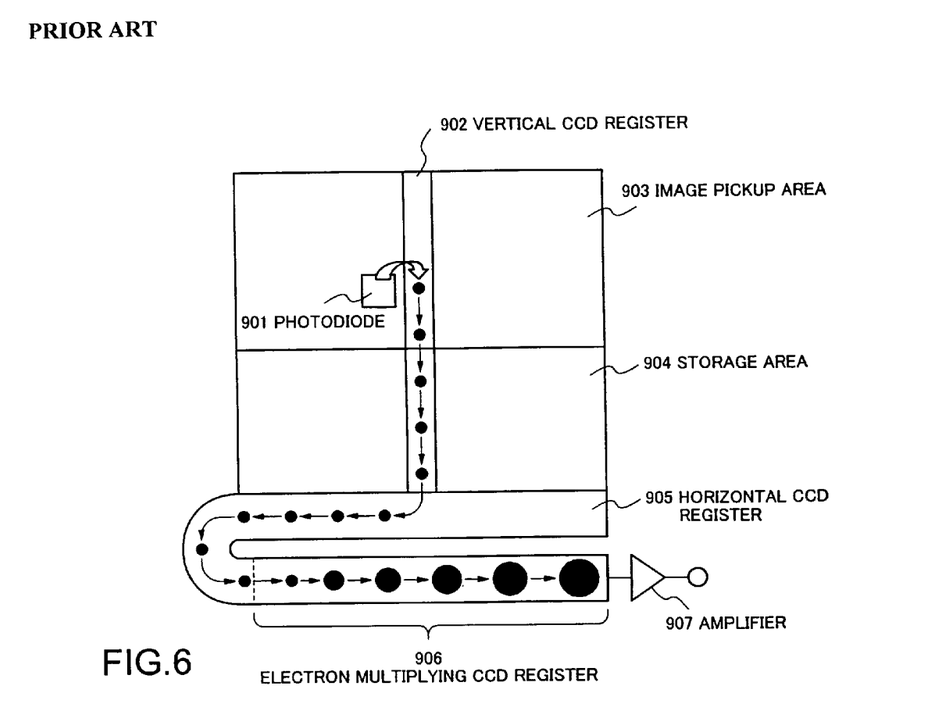
FIG. 6 shows an example of an electron multiplying CCD image pickup device.

FIG. 6 shows an example of such electron multiplying CCD image pickup devices. Referring to FIG. 6, the electron multiplying CCD image pickup device has an image pickup area 903, a storage area 904, a horizontal CCD register 905, an electron multiplying CCD register 906, and an output amplifier 907.

The image pickup area 903 has a photodiode 901 and a vertical CCD register 902 and generates signal charge (electrons). The storage area 904 accumulates signal charge transferred from the image pickup area 903. The horizontal CCD register 905 receives signal charge from the storage area 904 and transfers them horizontally. The electron multiplying CCD register 906 is connected to the horizontal CCD register 905 and multiplies signal charge provided from the horizontal CCD register 905. The output amplifier 907 converts a signal charge multiplied in the electron multiplying CCD register 906 to a voltage.

Figure 7:
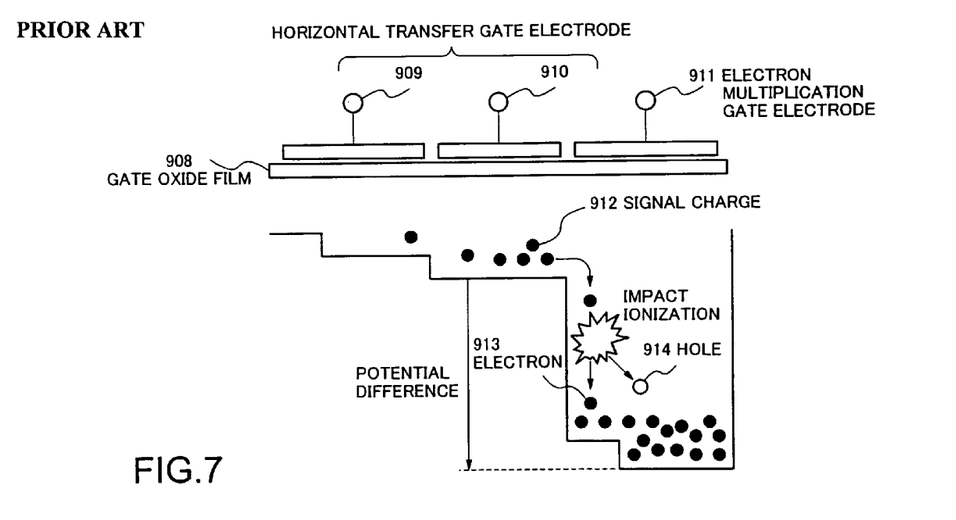
FIG. 7 shows a cross-section and an electric potential distribution of an electron multiplying CCD register 906 shown in FIG. 6.

FIG. 7 shows a cross-section and an electric potential distribution of the electron multiplying CCD register 906 shown in FIG. 6. Referring to FIG. 7, the electron multiplying CCD register 906 has a gate oxide film 908, horizontal transfer gate electrodes 909, 910, and an electron multiplication gate electrode 911. The horizontal transfer gate electrodes 909, 910 and the electron multiplication gate electrode 911 are placed on the top surface of the gate oxide film 908. The potential distribution of the gate oxide film 908 is schematically shown in FIG. 7.

Operation of the electron multiplying CCD image pickup device shown in FIG. 6 will be described below.

First, signal charge generated by photoelectric conversion in the photodiode 901 is read into the vertical CCD register 902. The signal charge read into the vertical CCD register 902 is vertically transferred through the image pickup area 903 and the storage area 904 to reach the horizontal CCD register 905. The signal charge is further horizontally transferred through the horizontal CCD register 905 to be sent to the electron multiplying CCD register 906.

In the electron multiplying CCD register 906, a high voltage is applied to the electron multiplication gate electrode 911 to generate a large potential difference (high electric field) as shown in FIG. 7.

The signal charge 912 which has reached the electron multiplying CCD register 906 is accelerated by the large potential difference and collides with a silicon crystal lattice. The collision causes impact ionization, which generates a new pair of an electron 913 and a hole 914. The hole 914 of the generated pair flows toward a silicon substrate and disappears, whereas the electron 913 is captured in a well.

In practice, several hundred electron multiplication gate electrodes are provided and the process described above is repeated at the several hundred electron multiplication gate electrodes to multiplying the signal charge.

Figure 8:
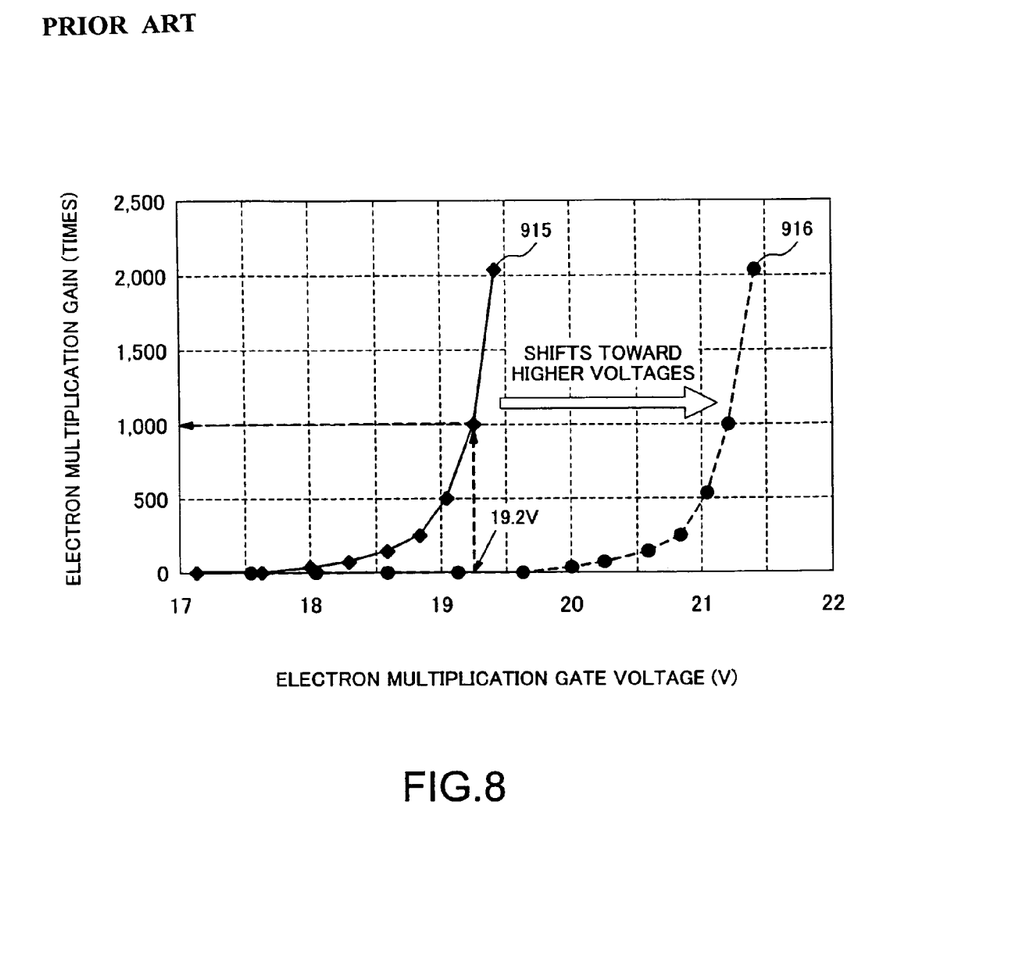
FIG. 8 is a graph of actual measurements of the electron multiplication gain of an electron multiplying CCD image pickup device.

FIG. 8 is a graph of actual measurements of the electron multiplication gain of an electron multiplying CCD image pickup device. Curve 915 shown in FIG. 8 represents the relationship between electron multiplication gate voltage and electron multiplication gain. As can be seen from curve 915, the electron multiplication gain is X1,024 when the electron multiplication gate voltage is 19.2 V.

However, the electron multiplication gate voltage which provides a predetermined electron multiplication gain in the electron multiplying CCD image pickup device as described above can shift toward higher values over time. Curve 916 shown in FIG. 8 shows the voltage of curve 915 that shifted with time. Curve 916 represents actual measurements of the electron multiplication gain after an accelerated test for approximately 100 hours.

Curve 916 is shifted from curve 915 in parallel toward higher voltages in the electron multiplying gate voltage by approximately 2 V. Before the time-course change, a same set voltage of 19.2 V provided a gain of X1,024, whereas, after the time-course changes, a set voltage of 19.2 V provided an electron multiplication gain of zero. The time-course change in the characteristic of electron multiplying CCD image pickup devices has inhibited stable operation of cameras.

Some researchers says the time-course changes in the characteristic of electron multiplying CCD image pickup devices occur because some of signal charges 912 (known as hot electrons) accelerated by the large potential difference or some of electrons 913 or holes 914 generated by impact ionization enter the gate oxide film 908 and are trapped in deep levels. However, the clarification of the real cause and a solution to the problem have not yet been accomplished.

SUMMARY OF THE INVENTION

An object of the present invention is to provide a mechanism capable of readily stabilizing the electron multiplication gain of an electron multiplying CCD image pickup device that enable a desired electron multiplication gain to be obtained by selecting an electron multiplication gate voltage.

An electron multiplication gain calibration mechanism according to the present invention comprises a gain adjusting section and a control section.

The gain adjusting section is provided independently of gain adjustment by electron multiplication of the electron multiplying CCD image pickup device, and sets a predetermined reference gain for a video level of an electric signal having passed through the electron multiplying CCD image pickup device.

The control section calibrates the electron multiplication gate voltage for obtaining a desired electron multiplication gain of the electron multiplying CCD image pickup device by comparing a video level amplified by the electron multiplication gain corresponding to the electron multiplication gate voltage having set to the electron multiplying CCD image pickup device to a video level amplified by the predetermined reference gain having set to the gain adjusting section.

When comparing video levels, the video level amplified by the reference gain is obtained without applying the electron multiplication gain, and also the video level amplified by the electron multiplication gain is obtained without applying the predetermined reference gain. The control section sets an initial value of the electron multiplication gate voltage, which is supposed to provide the electron multiplication gain equal to the reference gain, and controls the electron multiplication gate voltage gradually so that the video level amplified by the electron multiplication gain becomes equal to the video level amplified by reference gain. The electron multiplication gate voltage which provides the electron multiplication gain equal to the reference gain is a calibrated value of the electron multiplication gate voltage.

Therefore, the control section readily calibrates the electron multiplication gain by shifting the electron multiplication gate voltage for obtaining a desired electron multiplication gain by the difference between the initial value and the calibrated value of the electron multiplication gate voltage.

The control section may include an electron multiplication gate voltage adjusting section and an optical filter section which adjust a gain of light before the light enters the electron multiplying CCD image pickup device.

When comparing video levels in this case, the video level amplified by the reference gain is obtained without applying both of the electron multiplication gain and an optical filter gain, and also the video level amplified by the electron multiplication gain is obtained without applying the reference gain. The optical filter gain is set so that the sum of the optical filter gain and the electron multiplication gain which is supposed to be obtained by an initial value is equal to the reference gain. The control section calibrates the electron multiplication gate voltage so that the video level amplified by the electron multiplication gain and the optical filter gain becomes equal to the video level amplified by reference gain.

BRIEF DESCRIPTION OF THE DRAWINGS

Exemplary features and advantages of the present invention will become apparent from the following detailed description when taken with the accompanying drawings in which.

DESCRIPTION OF THE EXEMPLARY EMBODIMENTS

Embodiments of the present invention will be described in detail with reference to the accompanying drawings.

First Embodiment

Figure 1:
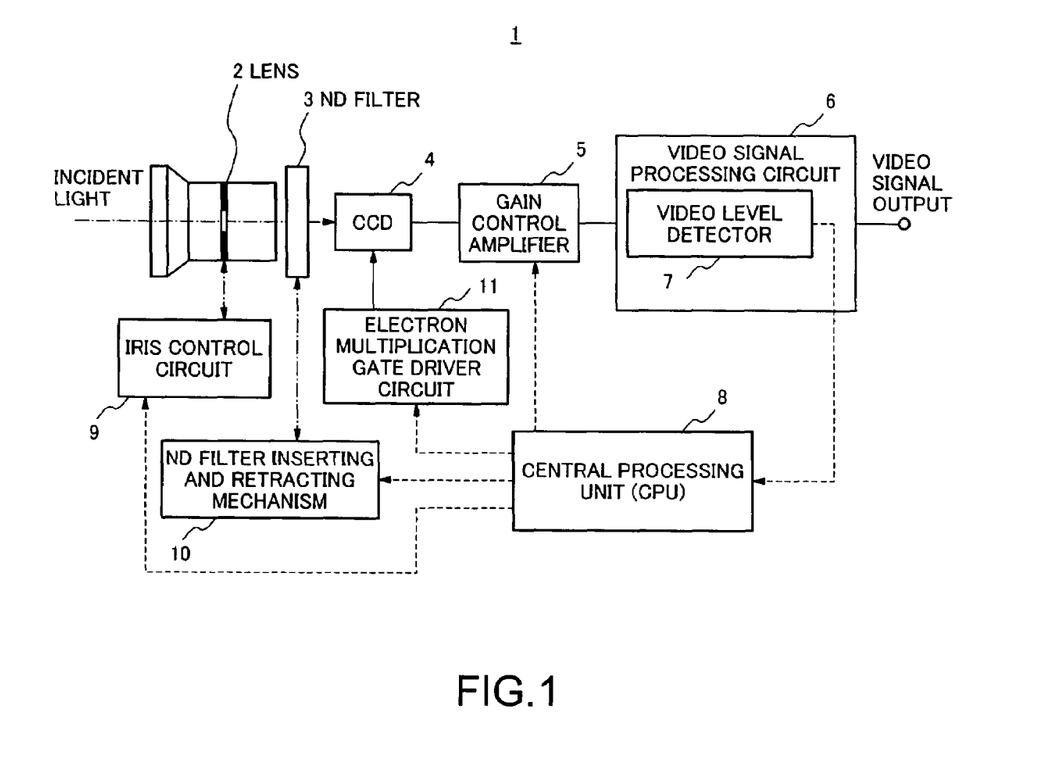
FIG. 1 is a block diagram showing a configuration of a camera according to a first embodiment.

FIG. 1 is a block diagram showing a configuration of a camera according to a first embodiment. The camera of the first embodiment is a single-plate monochrome camera using an electron multiplying CCD image pickup device.

Referring to FIG. 1, the camera 1 of this embodiment includes a lens 2, a neutral density filter (ND filter) 3, an electron multiplying CCD image pickup device 4, a gain control amplifier 5, a video signal processing circuit 6, a video level detector 7, a central processing unit (CPU) 8, an iris control circuit 9, an ND filter inserting and retracting mechanism 10, and an electron multiplication gate driver circuit 11.

Incident light enters the lens 2, and the lens 2 contains an iris mechanism, not shown, capable of adjusting the amount of light passing through it.

The ND filter 3, positioned at the stage subsequent to the lens 2, is a neutral density filter that can be inserted in and retracted from the light path leading from the lens 2. While the ND filter 3 is inserted in the light path, light passing through the lens 2 is dimmed by the ND filter 3 before entering in the electron multiplying CCD image pickup device 4.

The electron multiplying CCD image pickup device 4 converts incident light to signal charge, multiplies the signal charge, further converts the multiplied signal charge to a voltage, and outputs it as a time-sequence signal. The electron multiplying CCD image pickup device 4 multiplies signal charge with a gain (an electron multiplication gain) responsive to an electron multiplication gate voltage provided from the electron multiplication gate driver circuit 11. However, the characteristic of the electron multiplication gain with respect to the electron multiplication gate voltage of the electron multiplying CCD image pickup device 4 changes over time.

The gain control amplifier 5, which is an amplifier capable of controlling gain, changes the amplitude level of a signal output from the electron multiplying CCD image pickup device 4 and outputs the controlled signal. The signal output from the electron multiplying CCD image pickup device 4 is input into the video signal processing circuit 6 through the gain control amplifier 5.

The video signal processing circuit 6 applies various kinds of video signal processing to an input signal to generate and output a monochrome video signal. The video signal processing circuit 6 has a video level detector 7 which detects the average and peak values of a video level. Signals representing the average and peak values of a video level detected by the video level detector 7 are input into the CPU 8.

The CPU 8 operates by executing a program, controls the gain of the gain control amplifier 5 in accordance with a signal input from the video signal processing circuit 6, and also provides a control signal to the iris control circuit 9, the ND filter inserting and retracting mechanism 10, and the electron multiplication gate driver circuit 11.

The iris control circuit 9 controls the iris mechanism built in the lens 2 in accordance with a control signal from the CPU 8. The ND filter inserting and retracting mechanism 10 inserts and retracts the ND filter 3 in accordance with a control signal from the CPU 8. The electron multiplication gate driver circuit 11 controls an electron multiplication gate voltage to be applied to the electron multiplying CCD image pickup device 4 in accordance with a control signal from the CPU 8.

The gain control amplifier 5, the iris control circuit 9, the ND filter inserting and retracting mechanism 10, and the electron multiplication gate driver circuit 11 operate in conjunction with one another under the control of CPU 8.

Figure 2A:
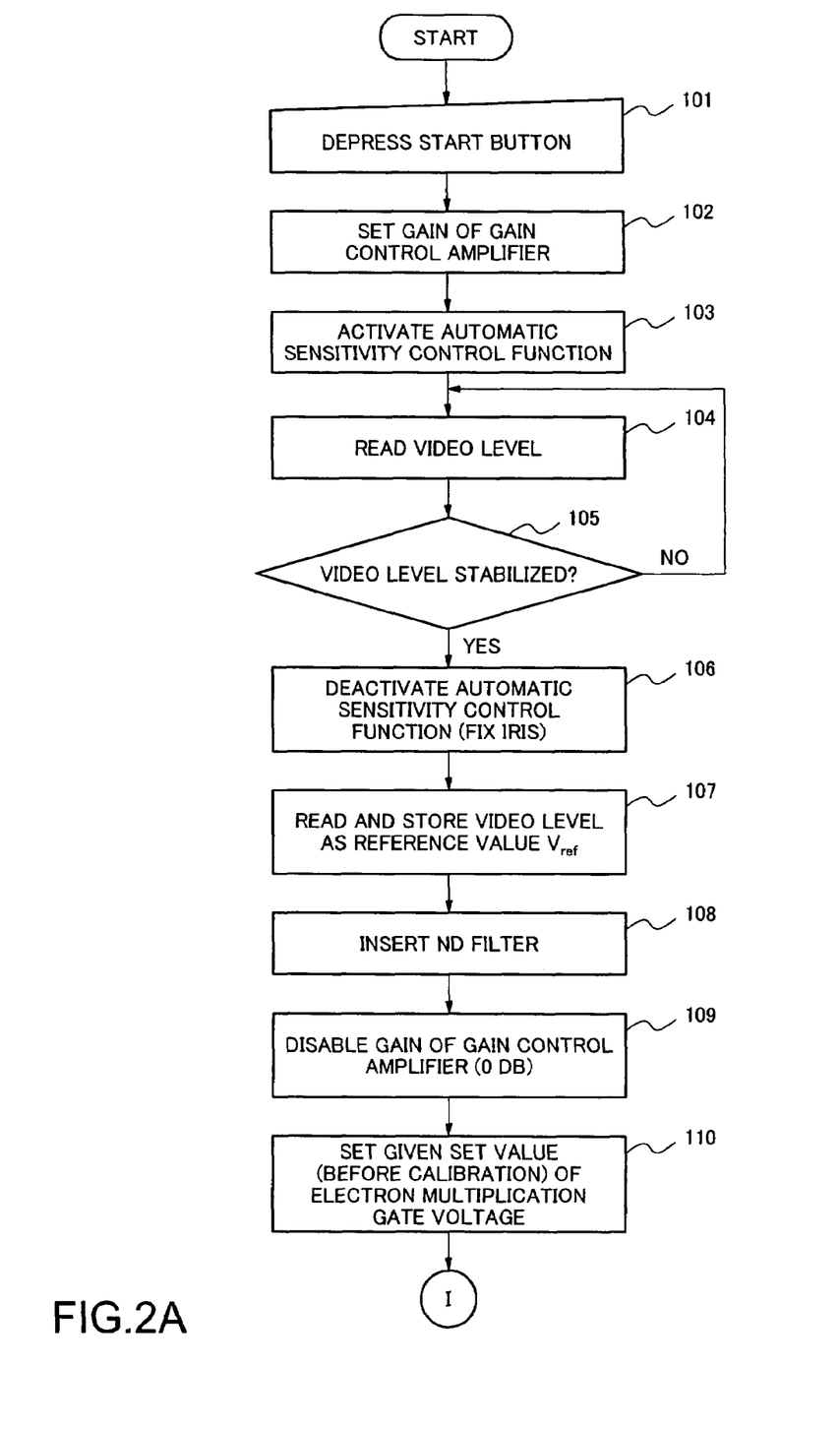
FIG. 2A is a flowchart illustrating operation of a camera 1 according to the first embodiment.
Figure 2B:
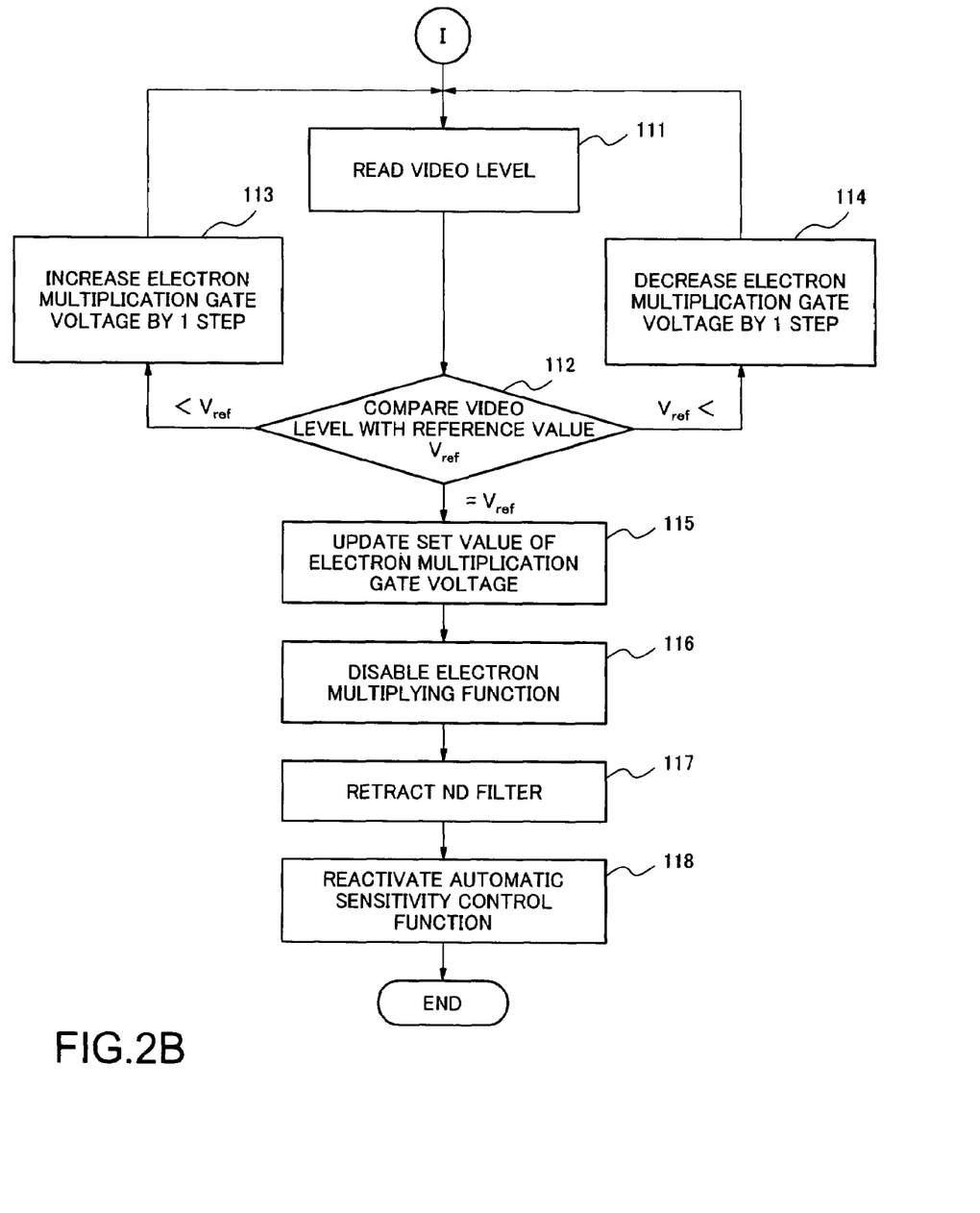
FIG. 2B is a flowchart illustrating operation of the camera 1 according to the first embodiment.

Calibration operation of the camera 1 according to this embodiment will be described below. FIGS. 2A and 2B are flowcharts illustrating operation of the camera 1 according to the first embodiment. The assumption here is that the normal sensitivity of the camera 1 is 2000 lux/F11. In this example, an electron multiplication gate voltage is calibrated for obtaining an electron multiplication gain of X1,024 (equivalent to 60 dB). That is, the target electron multiplication gain to be calibrated is 60 dB.

First, an image of a gray-scale chart or a still object illuminated with an illuminance of approximately 500 lux is picked up. Upon depression of the start button (step 101), control operation of the camera 1 automatically starts.

After starting calibration operation, the camera 1 sets a gain of +24 dB in the gain control amplifier 5 from the CPU 8 (step 102). Then, the camera 1 activates an automatic sensitivity controlling mechanism (step 103). In the automatic sensitivity controlling mechanism, the iris control circuit 9 controls the iris value of the iris mechanism built in the lens 2 in accordance with a control signal from the CPU 8 to automatically adjust a video level (the amount of light).

The CPU 8 reads a signal representing a video level (brightness of the object) detected by the video level detector 7 of the video signal processing circuit 6 while keeping the automatic sensitivity control mechanism operating (step 104). The average value of video levels, for example, may be used.

Then, the CPU 8 determines on the basis of the signal which CPU has read whether the video level has been stabilized (step 105). With the automatic sensitivity control mechanism being kept operating, steps 104 and 105 are repeated until the video level is stabilized at a predetermined level.

Once the video level has become stable, the camera 1 deactivates the automatic sensitivity control mechanism to fix the iris value (step 106). In the example shown, the iris value of the lens 2 should be approximately F 5.6.

The CPU 8 then reads the average and peak video level values output from the video level detector 7 at that state and stores them as reference values Vref (step 107). At this state, the electron multiplying function of the electron multiplying CCD image pickup device 4, in which time-course changes occur has not yet been activated and therefore a gain has been set only by the gain control amplifier 5 which suffer little time-course changes compared to the electron multiplying CCD image pickup device 4. Accordingly, the reference values Vref that have not been affected by the time-course changes can be obtained.

Then, the CPU 8 controls the ND filter inserting and retracting mechanism 10 to insert the 1/64 ND filter 3 (equivalent to −36 dB) into the light path (step 108). At the same time, the CPU 8 sets the gain of the gain control amplifier 5 to 0 dB to disable amplification (step 109).

The CPU 8 sets the electron multiplication gate voltage to a predetermined set value by a control signal to the electron multiplication gate driver circuit 11 (step 110). The value set here is an electron multiplication gate voltage value (before calibration) that is supposed to increase an electron multiplication gain by a factor of X1,024 (60 dB).

Figure 3:
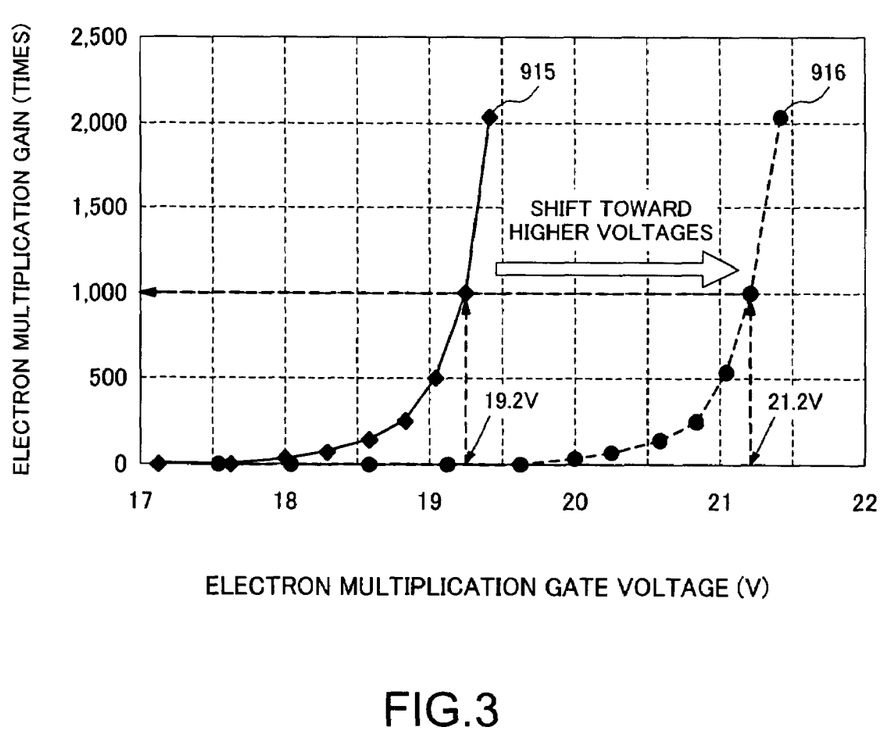
FIG. 3 is a graph of the electron multiplication gain of an electron multiplying CCD image pickup device 4 used in the camera 1 according to the first embodiment.

FIG. 3 is a graph of the electron multiplication gain of the electron multiplying CCD image pickup device 4 used in the camera 1 according to the first embodiment. It will be seen from curve 915 before calibration in FIG. 3 that the electron multiplication gate voltage for obtaining an electron multiplication gain of X1,024 is 19.2 V. Therefore, 19.2 V is set.

As can be seen from curve 915, before time-course changes, an electron multiplication gain of X1,024 (equivalent to 60 dB) could be obtained by setting an electron multiplication gate voltage of 19.2 V. The sum of the electron multiplication gain (60 dB) of the electron multiplying CCD image pickup device 4 and the gain (−36 dB) of the ND filter 3 is equal to the gain (24 dB) of the gain control amplifier 5 at the time point when the reference values Vref were obtained. Since the gain of the ND filter 3 as well as the gain of the gain control gain 5 is almost constant all the time, the video level detected at this time point would be equal to the reference value obtained earlier if the electron multiplication gain of the electron multiplying CCD image pickup device 4 had not changed over time. However, it is assumed here that the electron multiplication gain of the electron multiplying CCD image pickup device 4 has been changed over time to the characteristic represented by curve 916. Therefore, the video level detected here does not match the reference value Vref.

Referring to FIG. 2B, the CPU 8 then reads a signal representing a video level detected by the video level detector 7 (step 111). Subsequently, the CPU compares the read video level with the reference value Vref (step 112).

If the read video level is lower than the reference value Vref, the CPU 8 increases the electron multiplication gate voltage by 1 step (step 113). Here, 1 step is a control increment of voltage. On the other hand, if the read video level is higher than the reference value Vref, the CPU 8 decreases the electron multiplication gate voltage by 1 step (step 114).

In the example given, the electron multiplication gain has decreased to near zero over time as curve 916 in FIG. 3. Therefore, the read video level is far smaller than the reference value Vref. Steps 111 to 113 are repeated until the video level eventually becomes equal to the reference value Vref.

Once the video level becomes equal to the reference value Vref, the CPU 8 updates the electron multiplication gate voltage at that time point as a new value (step 115). As can be seen from curve 916 in FIG. 3, the electron multiplication gate voltage that can obtain an electron multiplication gain of X1,024 (equivalent to 60 dB) is 21.2 V. Therefore 21.2 V is set as the new set value.

Then, the CPU 8 reduces the electron multiplication gate voltage to deactivate the electron multiplying function (step 116). At the same time, the CPU 8 causes the ND filter inserting and retracting mechanism 10 to retract the ND filter 3 (step 117).

Finally, the CPU 8 reactivates the automatic sensitivity control function deactivated at step 106 to restore the normal operation of the camera 1 (step 118).

As a result of the calibration operation described above, the camera 1 is made to be operated in accordance with curve 916 in FIG. 3.

Curve 916 in FIG. 3 after the values have changed over time is equivalent to curve 915 before the change shifted in parallel toward higher voltages. The time-course changes in voltages in electron multiplying CCD image pickup devices in general have such nature. Therefore, calibration descried with respect to FIGS. 2A and 2B does not need to be performed at more than one point in order to obtain curve 916 representing values after time-course changes. The curve 916 can be obtained simply by adding a shift amount obtained by calibration performed for any one point to an input-output correspondence table (lookup table) representing a curve 915 before time-course changes or, by adding an offset to an approximation formula if known.

As has been described, according to this embodiment, the video level, which is set at the state of a reference gain without electron multiplication by the electron multiplying CCD image pickup device 4 but only by the gain control amplifier 5 that does not suffer from time-course changes, is used as the reference value Vref. Control is performed so that a measured video level obtained through the ND filter 3 which does not suffer from time-course changes and the electron multiplying CCD image pickup device 4 becomes equal to the reference value Vref, where the sum of the gain by the ND filter 3 and the gain by the electron multiplying CCD image pickup device 4, which is supposed to be a calibration target electron multiplication gain, is set to the reference gain. As a result, an electron multiplication gate voltage at which the electron multiplication gain of the electron multiplication CCD image pickup device 4 is equal to the calibration target value can be obtained. Thus, according to the embodiment, the electron multiplication gate voltage can be readily calibrated to obtain a desired electron multiplication gain on the basis of the gain control amplifier 5 and the ND filter 3 that exhibit little time-course changes.

Furthermore, according to the embodiment, the electron multiplication gate voltage of any electron multiplication gain can be calibrated by offsetting the characteristic curve on the basis of the result at a calibration target of one point. This is because there is the fact that the electron multiplication gain characteristic of an electron multiplying CCD image pickup device 4 shifts in parallel toward the direction of the voltages due to the time-course changes.

According to the embodiment, increase of the scale of a device resulting from addition of the calibration capability can be avoided because components that are already present in a camera 1, such as the gain control amplifier 5 and the ND filter 3, are used to perform calibration.

While the present embodiment has been illustrated with respect to a configuration in which the gain control amplifier 5 is provided between an electron multiplying CCD image pickup device 4 and a video signal processing circuit 6, the present invention is not so limited. In another example, a function equivalent to the gain control amplifier 5 may be implemented by adjusting the CCD charge storage period of an electron multiplying CCD image pickup device 4.

For example, setting a gain of the gain control amplifier 5 to +24 dB is equivalent to setting a CCD charge storage period of 16 frames. In that case, the CCD charge storage period may be controlled at steps 102 and 109 of the flowchart shown in FIG. 2A instead of setting the gain of the gain control amplifier 5.

While the embodiment has been described with respect to an example in which a retractable ND filter 3 is provided at the stage subsequent to the lens 2, the present invention is not so limited. In another example, a function equivalent to the retraction and insertion of the ND filter 3 may be implemented by a CCD electronic shutter function. For example, the dimming ratio of a 1/64 ND filter is approximately equivalent to that obtained by setting the CCD electronic shutter speed to 1/4000 second. In that case, the CCD electronic shutter function may be activated at steps 108 and 117 of the flowcharts shown in FIGS. 2A and 2B, instead of inserting and retracting the ND filter 3 under the control of the ND filter inserting and retracting mechanism 10.

Second Embodiment

Figure 4:
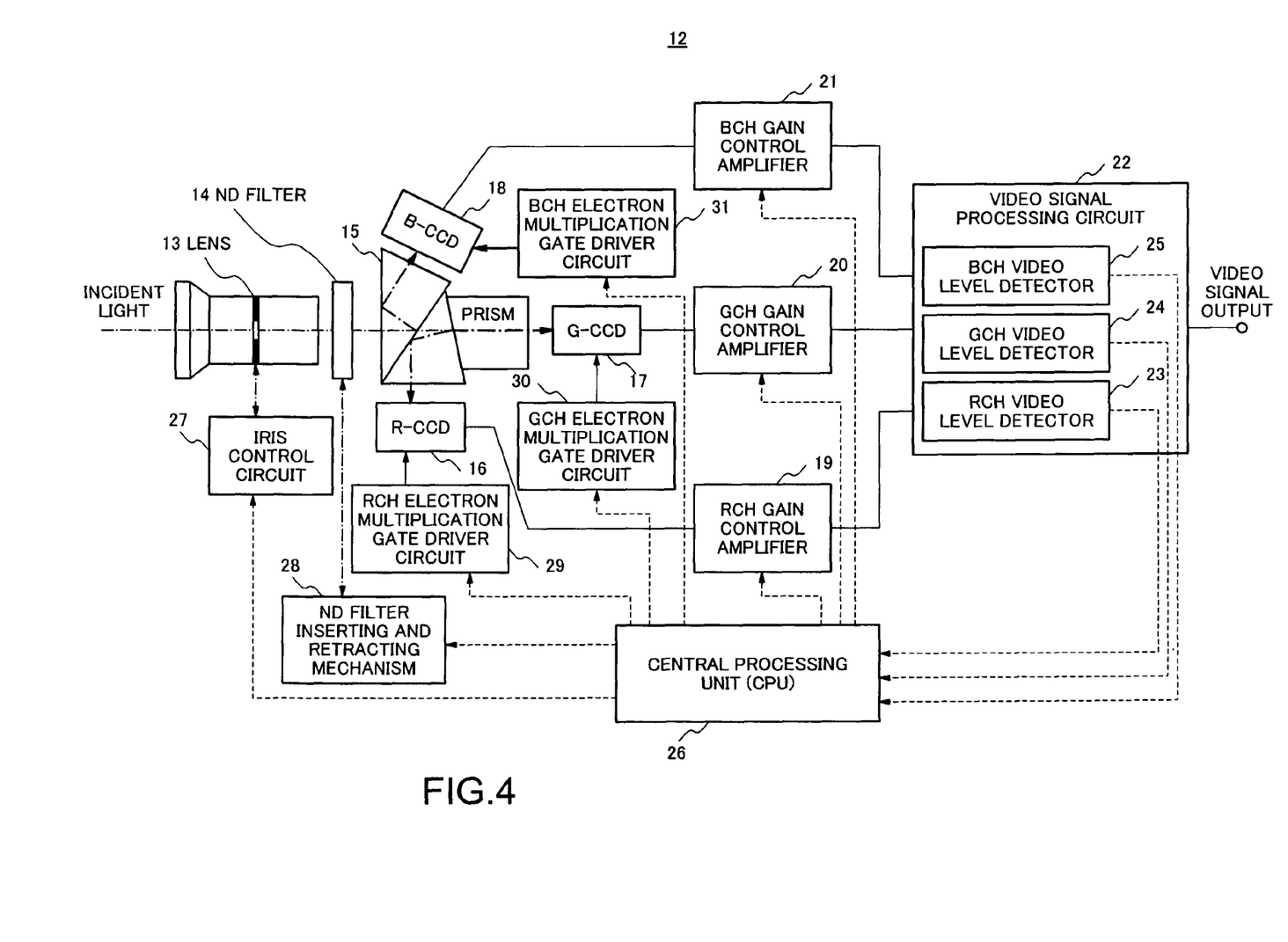
FIG. 4 is a block diagram showing a configuration of a camera according to a second embodiment.

FIG. 4 is a block diagram showing a configuration of a camera according to a second embodiment. The camera according to the embodiment is a three-plate color camera using three electron multiplying CCD image pickup devices.

Referring to FIG. 4, the camera 12 of the embodiment includes a lens 13, a neutral density filter (ND filter) 14, a prism 15, Bch, Gch, and Rch electron multiplying CCD image pickup devices 16 to 18, Rch, Gch, and Bch gain control amplifiers 19 to 21, a video signal processing circuit 22, a CPU 26, an iris control circuit 27, an ND filter inserting and retracting mechanism 28, and Rch, Gch, and Bch electron multiplication gate driver circuits 29 to 31.

Incident light enters the lens 13, and the lens 13 contains an iris mechanism, not shown, capable of adjusting the amount of light passing through it.

The ND filter 14, disposed at the stage subsequent to the lens 13, is a neutral density filter that can be inserted in and retracted from a light path leading from the lens 13. While the ND filter 3 is inserted in the light path, light from the lens 13 is dimmed by the ND filter 14 before it enters the color separation optical system (prism) 15.

The prism 15 separates incident light into three primary colors, R (read), G (green), and B (blue), and provides them to the Rch electron multiplying CCD image pickup device 16, Gch electron multiplying CCD image pickup device 17, and the Bch electron multiplying CCD device 18, respectively.

The Rch, Gch, and Bch electron multiplying CCD image pickup devices 16 to 18 convert incident light into signal charges, multiply the signal charges, convert the multiplied signal charges to voltages, and outputs them as time-sequence signals. Each of Rch, Gch, and Bch electron multiplying CCD image pickup devices 16 to 18 multiplies the signal charge with a gain (an electron multiplication gain) responsive to an electron multiplication gate voltage provided from its associated electron multiplication gate driver circuits 29 to 31. However, the characteristic of the electron multiplication gains responsive the electron multiplication gate voltages of the electron multiplying CCD image pickup devices 16 to 18 changes over time.

The Rch, Gch, and Bch gain control amplifiers 19 to 21 are amplifiers capable of controlling gain and increase or decrease the amplitude level of signals output from their associated electron multiplying CCD image pickup devices 16 to 18 and output the signals. The signals output from the electron multiplying CCD image pickup devices 16 to 18 are input to the video signal processing circuit 22 through the gain control amplifiers 19 to 21.

The video signal processing circuit 22 applies various kinds of video signal processing to the three input signals to generate and output color video signal. The video signal processing circuit 22 has three video level detectors 23 to 25 that detect average and peak values of a video level. Three signals representing the average and peak values of the video levels detected at the Rch, Gch, and Bch video level detectors 23 to 25 are input to the CPU 26.

The CPU 26 operates by executing a program, controls the gains of the gain control amplifiers 19 to 21 in accordance with a signal input from the video signal processing circuit 22, and provides a control signal to the iris control circuit 27, the ND filter inserting and retracting mechanism 28, and the electron multiplication gate driver circuits 29 to 31.

The iris control circuit 27 controls the iris mechanism built in the lens 13 in accordance with a control signal from the CPU 26. The ND filter inserting and retracting mechanism 28 retracts and inserts the ND filter 14 in accordance with a control signal form the CPU 26. The Rch, Gch, and Bch electron multiplication gate driver circuits 29 to 31 control an electron multiplication gate voltage to be applied to the electron multiplying CCD image pickup devices 16 to 18 in accordance with a control signal from the CPU 26.

The gain control amplifiers 19 to 21, the iris control circuit 27, the ND filter retracing and inserting mechanism 28, and the electron multiplication gate driver circuits 29 to 31 operate in conjunction with one another under the control of the CPU 26.

Figure 5A:
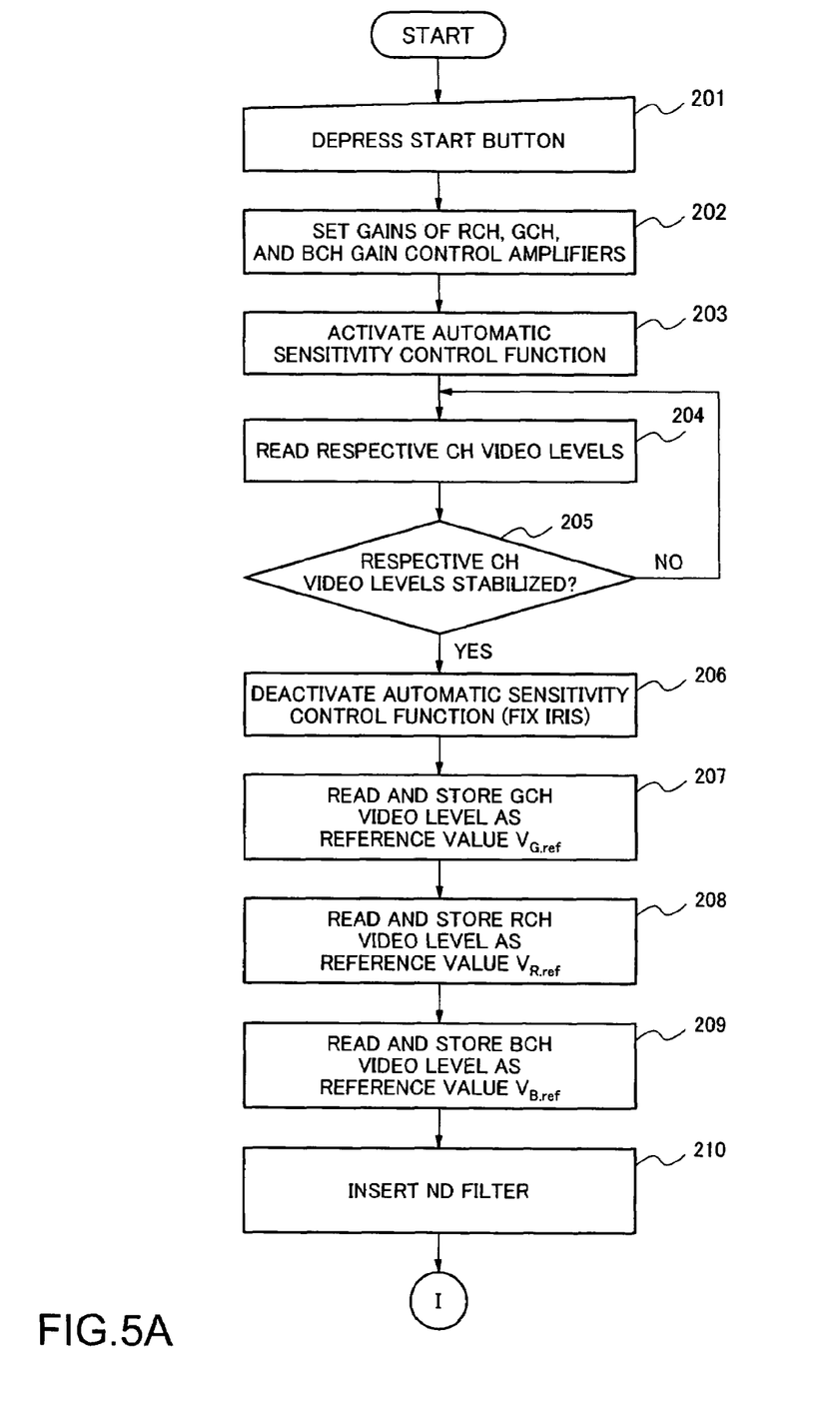
FIG. 5A is a flowchart illustrating operation of a camera 12 according to the second embodiment.
Figure 5B:
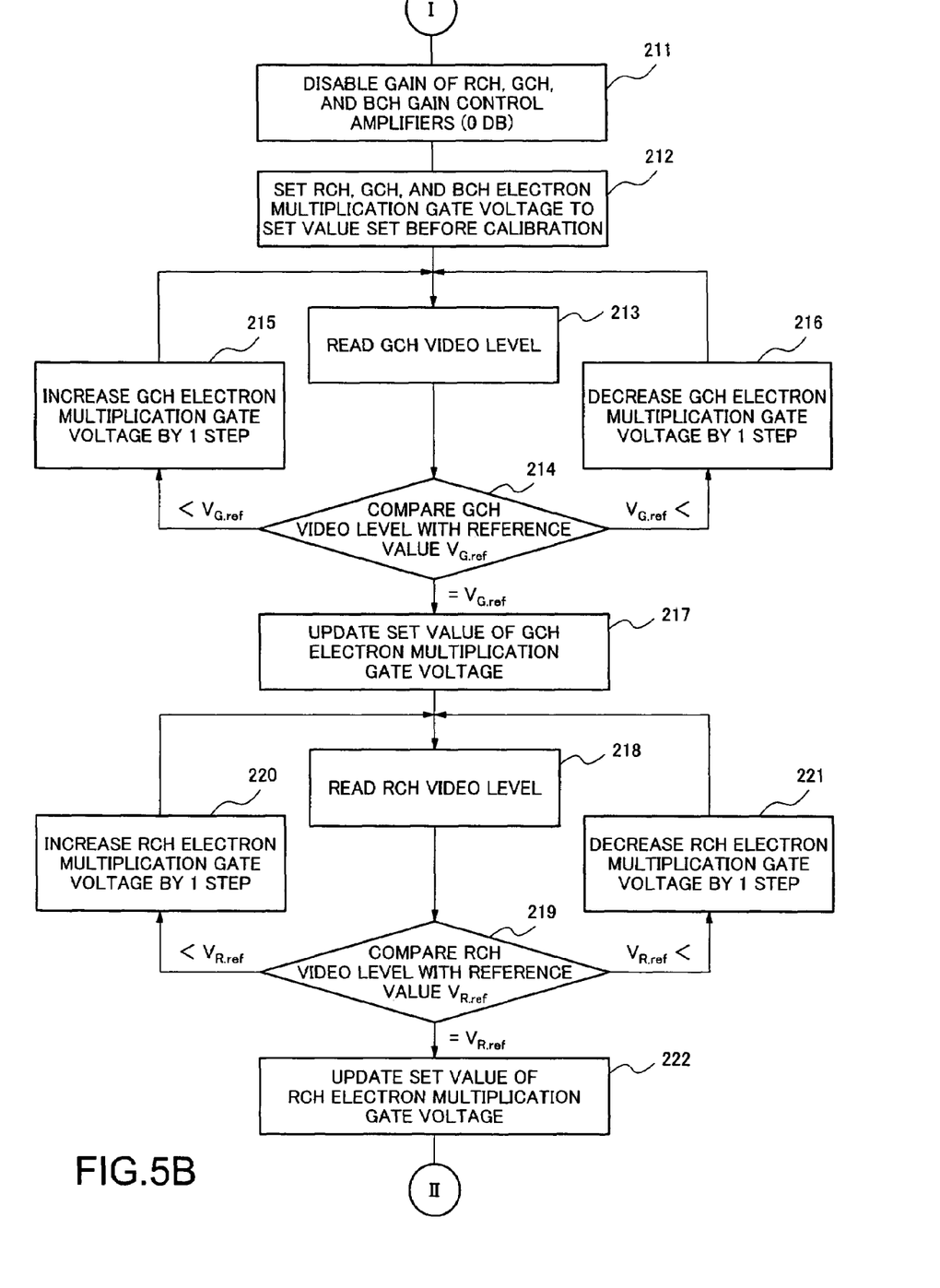
FIG. 5B is a flowchart illustrating operation of the camera 12 according to the second embodiment.
Figure 5C:
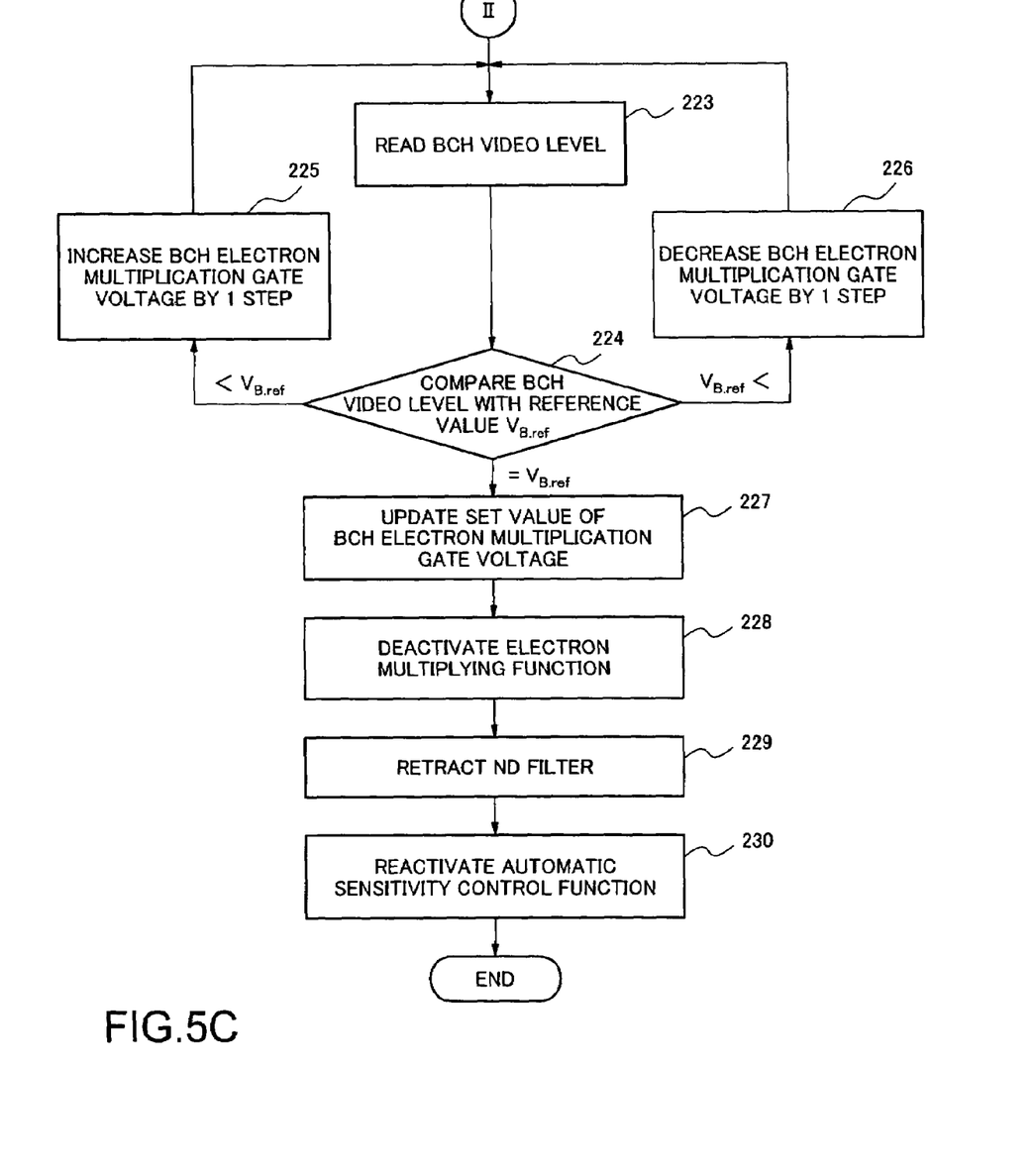
FIG. 5C is a flowchart illustrating operation of the camera 12 according to the second embodiment.

Calibration operation of a camera 12 according to the embodiment will be described below. FIGS. 5A to 5C are flowcharts of operation of the camera 12 according to the second embodiment. It is assumed here that the normal sensitivity of the camera 12 is 2000 lux/F11. In the example, an electron multiplication gate voltage is calibrated in order to obtain an electron multiplication gain of X1,024 (equivalent to 60 dB).

First, an image of a grayscale chart or a still object illuminated with an illuminance of approximately 500 lux is picked up. Upon depression of the start button (step 201), control operation of the camera 12 automatically starts.

After starting calibration operation, the camera 12 sets a gain of +24 dB in the gain control amplifiers 19 to 21 from CPU 26 (step 202). Then, the camera 12 activates an automatic sensitivity control mechanism (step 203). In the automatic sensitivity control mechanism, the iris control circuit 27 controls the iris value of the iris mechanism built in the lens 13 in accordance with the control signal from the CPU 26 to adjust the video level (the amount of light).

While the automatic sensitivity control mechanism is operating, the CPU 26 first reads signals representing video levels detected by the video level detectors 23 to 25 (step 204). For example, the average of the video levels may be used.

The CPU 26 then determines from the read signals whether the respective video levels become stable (step 205). Steps 204 and 205 are repeated until the respective video levels are stabilized at a predetermined level while keeping the automatic sensitivity control mechanism operating.

Once the respective video levels become stable, the camera 12 deactivates the automatic sensitivity control mechanism to fix the iris value (step 206). In this example, the iris value of the lens 13 should be approximately F 5.6.

Then, the CPU 26 reads the average and peak values of a video level being output from the level detector 24 at that point and stores them as the reference value VGref of Gch (step 207). Similarly, the CPU 26 reads the average and peak values of the video level being output from the video level detector 23 under that condition and stores them as the reference value VRref of Rch (step 208). The CPU 26 also reads the average and peak values of a video level output form the level detector 25 under that condition and stores them as the reference value VBref of Bch (step 209).

The CPU 26 then controls the ND filter inserting and retracting mechanism 28 to insert the 1/64 ND filter 14 (equivalent to −36 dB) in the light path (step 210). At the same time, the CPU 26 sets the gain of the gain control amplifiers 19 to 21 to 0 dB to disable amplification of Rch, Gch, and Bch (step 211).

In addition, the CPU 26 provides a control signal to the Rch, Gch, and Bch electron multiplication gate driver circuits 29 to 31 to set the electron multiplication gate voltage to predetermined set values (step 212). The values set here are electron multiplication (unadjusted) gate voltages that is supposed to provide an electron multiplication gain of X1,024 (equivalent to 60 dB).

It is assumed here that the electron multiplication gain of the electron multiplying CCD image pickup devices 16 to 18 is the same as that in the first embodiment. It can be seen from curve 915 representing unadjusted voltages in FIG. 3 that the electron multiplication gate voltage for obtaining an electron multiplication gain of X1,024 is 19.2 V. Therefore 19.2 V is set.

As can be seen from curve 915, an electron multiplication gain of X1,024 (equivalent to 60 dB) was obtained by setting the electron multiplication gate voltage to 19.2 V before the time-course changes. If this state was maintained, the video levels of the channels would be equal to the reference value VRref, VGref, and VBref that were obtained before. However, it is assumed here that the electron multiplication gain of the electron multiplying CCD image pickup devices 16 to 18 has changed over time to the characteristic as represented by curve 916.

Then, the CPU 26 reads a signal representing a video level detected by the Gch video level detector 24 (step 213). The CPU 26 then compares the read video level with the reference value VGref (step 214).

If the read video level is lower than the reference value VGref, the CPU 26 increase the electron multiplication gate voltage by 1 step (step 215). Here, 1 step is a control increment. On the other hand, if the read video level is higher than the reference value VGref, the CPU 26 decreases the electron multiplication gate voltage by 1 step (step 216).

In the example given here, the electron multiplication gain has decreased to near 0 due to the time-course changes as can be seen from curve 916 in FIG. 3 and therefore the read video level is far lower than the reference value Vref. Therefore, steps 213 to 215 are repeated until the video level eventually becomes equal to the reference value VGref.

Once the video level becomes equal to the reference value VGref, the CPU 26 updates the electron multiplication gate voltage at that time point as a new set value (step 217). Referring to curve 916 in FIG. 3, it will be seen that the electron multiplication gate voltage that provides an electron multiplication gain of X1,024 (equivalent to 60 dB) is 21.2 V. Therefore 21.2 V is set as the new set value.

Then, the CPU 26 reads a signal representing a video level detected by Rch video level detector 23 as in the case of Gch (step 218). Subsequently, the CPU 26 compares the read video level with the reference value VRref (step 219).

If the read video level is lower than the reference value VRref, the CPU 26 increases the electron multiplication gate voltage by 1 step (step 220). On the other hand, if he read video level is higher than the reference value VRref, the CPU 26 decreases the electron multiplication gate voltage by 1 step (step 221).

In the example given here, because the electron multiplication gain has decreased to near zero due to the time-course changes, the read video level is far lower than the reference value VRref. Therefore, steps 218 to 220 are repeated until each video level eventually becomes equal to the reference value VRref.

Once the video level becomes equal to the reference value VRref, the CPU 26 updates the set value to the electron multiplication gate voltage at that time point as a new set value (step 222). Referring to curve 916 in FIG. 3, it will be seen that the electron multiplication gate voltage that provides an electron multiplication gain of X1,024 (equivalent to 60 dB) is 21.2 V. Therefore 21.2 V is set as the new set value.

Then, the CPU 26 reads a signal representing a video level detected by Bch video level detector 25 (step 223). Subsequently, the CPU 26 compares the read video level with the reference value VBref (step 224).

If the read video level is lower than the reference value VRref, the CPU 26 increases the electron multiplication gate voltage by 1 step (step 225). Here, 1 step is a control increment. On the other hand, if the read video level is higher than the reference value VBref, the CPU 26 decreases the electron multiplication gate voltage by 1 step (step 226).

In the example given here, the electron multiplication gain has decreased to near zero due to the time-course changes as can be seen from curve 916 in FIG. 3, therefore the read video signal is far lower than the reference value VBref. Therefore, steps 223 to 225 are repeated until each video level eventually becomes equal to the reference value VBref.

Once the video level becomes equal to the reference value VBref, the CPU 26 updates the electron multiplication gate voltage at that time point as a new set value (step 227). Referring to curve 916 in FIG. 3, it will be seen that the electron multiplication gate voltage that provides an electron multiplication gain of X1,024 (equivalent to 60 dB) is 21.2 V. Therefore 21.2 V is set as the new set value.

Then, the CPU 26 reduces the electron multiplication gate voltage to disable the electron multiplying function (step 228). At the same time, the CPU 26 causes the ND filter inserting and retracting mechanism 28 to retract the ND filter 14 (step 229).

Finally, the CPU 26 reactivates the automatic sensitivity control function deactivated at step 206 to restore the normal operation of the camera 12.

As a result of the calibration operation described above, the camera 12 operates in accordance with curve 916 in FIG. 3.

Curve 916 shown in FIG. 3 after time-course changes is equivalent to curve 915 before the time-course changes shifted in parallel toward higher voltages. Time-course changes in electron multiplying CCD image pickup devices in general have such a characteristic. Therefore, calibration shown in FIGS. 5A to 5C does not needed to be performed more than one points in order to determine curve 916 representing values after time-course changes. The curve 916 can be obtained simply by adding a shift amount obtained by calibration performed for any one point to an input-output correspondence table (lookup table) representing a curve 915 before time-course changes or, by adding an offset to an approximation formula if known.

As has been described above, according to the second embodiment, an electron multiplication gate voltage can be readily calibrated for obtaining a desired electron multiplication gain even in a three-plate color camera that uses three electron multiplying CCD image pickup devices in a manner similar to the first embodiment.

While the second embodiment has been described with respect to an example in which gain control amplifiers 19 to 20 are provided between each of electron multiplying CCD image pickup devices 16 to 18 and a video processing circuit 22, the present invention is not so limited. In another example, a function equivalent to the gain control amplifiers 19 to 21 may be implemented by adjusting the CCD charge storage period of electron multiplying CCD image pickup devices 16 to 18.

For example, setting a gain of +24 dB of the gain control amplifiers 19 to 21 is equivalent to setting a CCD charge storage period of 16 frames. In that case, the CCD charge storage period may be controlled at steps 202 and 211 of the flowchart shown in FIGS. 5A and 5B instead of setting the gain of the gain control amplifiers 19 to 21.

While the embodiment has been described with respect to an example in which a retractable ND filter 14 is provided at the stage subsequent to a lens 13, the present invention is not so limited. In another example, a function equivalent to the insertion and retraction of the ND filter 14 may be implemented by a CCD electronic shutter function. For example, the dimming ratio of a 1/64 ND filter is substantially equivalent to that obtained by setting the CCD electronic shutter speed to 1/4000 second. In that case, the CCD electronic shutter function may be activated at steps 210 and 229 of the flowcharts shown in FIGS. 5A and 5C, instead of inserting and retracting the ND filter 14 under the control of the ND filter inserting and retracting mechanism 28.

While the first embodiment has been described with respect to a single-plate monochrome camera and the second embodiment has been described with respect to a three-plate color camera, the present invention is not limited to those. For example, the present invention can be applied to a single-plate color camera or a camera using an image intensifier or an avalanche-multiplying image pickup tube.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. An electron multiplication gain calibration mechanism for calibrating an electron multiplication gain of an electron multiplying CCD image pickup device capable of obtaining a desired electron multiplication gain by selecting an electron multiplication gate voltage, comprising:

a gain adjusting section which is provided independently of gain adjustment by electron multiplication of the electron multiplying CCD image pickup device, and sets a predetermined reference gain for a video level of an electric signal having passed through the electron multiplying CCD image pickup device; and a control section which calibrates the electron multiplication gate voltage for obtaining a desired electron multiplication gain of the electron multiplying CCD image pickup device by comparing a video level amplified by the electron multiplication gain corresponding to the electron multiplication gate voltage having set to the electron multiplying CCD image pickup device to a video level amplified by the predetermined reference gain having set to the gain adjusting section and, wherein, the video level amplified by the predetermined reference gain is obtained without applying the electron multiplication gain, and the control section sets an initial value of the electron multiplication gate voltage, which is supposed to provide the electron multiplication gain equal to the reference gain, and controls, without applying the predetermined reference gain, the electron multiplication gate voltage so that the video level amplified by the electron multiplication gain becomes equal to the video level amplified by reference gain.

2. The electron multiplication gain calibration mechanism according to claim 1, wherein the electron multiplication gate voltage which provides the electron multiplication gain equal to the reference gain is recorded as a calibrated value of the electron multiplication gate voltage.

3. The electron multiplication gain calibration mechanism according to claim 2, wherein the control section shifts an electron multiplication gate voltage to be set for obtaining a desired electron multiplication gain by the difference between the initial value and the calibrated value of the electron multiplication gate voltage.

4. The electron multiplication gain calibration mechanism according to claim 1, wherein the control section comprising:

a video level detecting section which detects a video level of an electric signal having passed through the electron multiplying CCD image pickup device and the gain adjusting section;

an electron multiplication gate voltage adjusting section which adjusts the electron multiplication gate voltage for obtaining a desired electron multiplication gain of the electron multiplying CCD image pickup device;

an optical filter section which adjust a gain of light before the light enters the electron multiplying CCD image pickup device; and a calibration control section which controls calibration of the electron multiplication gate voltage by comparing video levels detected by the video level detecting section with respect to the video levels amplified by the electron multiplication gain and the predetermined reference gain respectively, wherein, the video level amplified by the predetermined reference gain is obtained without applying both of the electron multiplication gain and an optical filter gain, the optical filter gain is set so that the sum of the optical filter gain and the electron multiplication gain which is supposed to be obtained by an initial value set to the electron multiplication gate voltage adjusting section is equal to the predetermined reference gain, and calibrates, without applying the predetermined reference gain, the electron multiplication gate voltage so that the video level amplified by the electron multiplication gain and the optical filter gain becomes equal to the video level amplified by reference gain.

5. An electron gain calibration mechanism according to claim 4, wherein the optical filter section is formed by at least one of a neutral density filter which, when inserted in light path, reduces the amount of light passing through the neutral density filter and a CCD electronic shutter that reduces the amount of light passing through the CCD electronic shutter in accordance with an electronic shutter speed.

6. The electron multiplication gain calibration mechanism according to claim 4, wherein the gain adjusting section sets the predetermined reference gain by changing the length of a charge accumulation time period of the electron multiplying CCD image pickup device.

7. An electron multiplication gain calibration method for calibrating an electron multiplication gain of an electron multiplying CCD image pickup device capable of obtaining a desired electron multiplication gain by selecting an electron multiplication gate voltage, comprising:

a reference gain setting step for setting a predetermined reference gain independently of gain adjustment by electron multiplication of the electron multiplying CCD image pickup device;

an initial value setting step for setting, to the electron multiplying CCD image pickup device, an initial value of the electron multiplication gate voltage which is supposed to provide the electron multiplication gain equal to the predetermined reference gain;

a video level comparing step for comparing a video level amplified by the electron multiplication gain corresponding to the electron multiplication gate voltage having set to the electron multiplying CCD image pickup device to a video level amplified by the predetermined reference gain;

a calibrating step for calibrating the electron multiplication gate voltage so that the video level amplified by the electron multiplication gain becomes equal to the video level amplified by reference gain; and a recording step for recording the electron multiplication gate voltage when the video level amplified by the electron multiplication gain is equal to the video level amplified by reference gain as a calibrated value of the electron multiplication gate voltage, wherein, the video level amplified by the predetermined reference gain is obtained without applying the electron multiplication gain, and the video level amplified by the electron multiplication gain is obtained without applying the predetermined reference gain.

8. The electron multiplication gain calibration method according to claim 7, wherein further comprising a shifting step for shifting the electron multiplication gate voltage by the difference between the initial value and the calibrated value of the electron multiplication gate voltage for obtaining a desired electron multiplication gain of the electron multiplying CCD image pickup device.

9. The electron multiplication gain calibration method according to claim 7, the initial value setting step further comprising an optical filter adjusting step for providing an optical filter gain to adjust a gain of light before the light enters the electron multiplying CCD image pickup device; and wherein, the video level amplified by the predetermined reference gain is obtained without applying both of the electron multiplication gain and the optical filter gain, the optical filter gain is set so that the sum of the optical filter gain and the electron multiplication gain which is supposed to be obtained by an initial value of the electron multiplication gate voltage is equal to the predetermined reference gain, and calibrates, without applying the predetermined reference gain, the electron multiplication gate voltage so that the video level amplified by the electron multiplication gain and the optical filter gain becomes equal to the video level amplified by reference gain.

* * * * *